United States Patent
Komizo et al.

(10) Patent No.: US 7,393,225 B2
(45) Date of Patent: Jul. 1, 2008

(54) ELECTRICAL EQUIPMENT DISASSEMBLY STRUCTURE

(75) Inventors: Kenichiro Komizo, Makinohara (JP); Isao Yoneyama, Toyota (JP)

(73) Assignee: Yazaki Corporation, Tokyo (JP)

( * ) Notice: Subject to any disclaimer, the term of this patent is extended or adjusted under 35 U.S.C. 154(b) by 226 days.

(21) Appl. No.: 11/446,126

(22) Filed: Jun. 5, 2006

(65) Prior Publication Data

US 2006/0286844 A1 Dec. 21, 2006

(30) Foreign Application Priority Data

Jun. 3, 2005 (JP) .............................. 2005-164555

(51) Int. Cl.
*H01R 13/62* (2006.01)
(52) U.S. Cl. ..................................................... 439/180
(58) Field of Classification Search ................ 439/701, 439/712, 732, 180, 475, 949
See application file for complete search history.

(56) References Cited

U.S. PATENT DOCUMENTS

| | | | | |
|---|---|---|---|---|
| 5,217,386 A | * | 6/1993 | Ohsumi et al. | 439/364 |
| 5,312,268 A | * | 5/1994 | Sumida | 439/364 |
| 5,431,573 A | * | 7/1995 | Endo et al. | 439/157 |
| 5,454,733 A | * | 10/1995 | Watanabe et al. | 439/540.1 |
| 5,480,322 A | * | 1/1996 | Ishii et al. | 439/378 |
| 5,545,053 A | * | 8/1996 | Ishii et al. | 439/364 |
| 5,679,028 A | * | 10/1997 | Yagi et al. | 439/701 |
| 5,967,808 A | * | 10/1999 | Kubota | 439/157 |
| 6,126,458 A | * | 10/2000 | Gregory et al. | 439/76.2 |
| 6,152,758 A | * | 11/2000 | Matsuoka | 439/364 |
| 6,417,451 B1 | * | 7/2002 | Uchiyama | 174/72 A |
| 6,610,929 B1 | * | 8/2003 | Motokawa | 174/72 A |
| 6,773,271 B2 | * | 8/2004 | Falchetti | 439/76.2 |
| 6,796,802 B2 | * | 9/2004 | Iwata | 439/34 |
| 6,887,089 B2 | * | 5/2005 | Nishide | 439/157 |
| 7,037,124 B2 | * | 5/2006 | Lee et al. | 439/157 |
| 7,074,063 B1 | * | 7/2006 | Bailey et al. | 439/157 |
| 7,255,597 B2 | * | 8/2007 | Nakamura et al. | 439/573 |
| 2002/0061677 A1 | * | 5/2002 | Iwata | 439/475 |
| 2003/0068910 A1 | * | 4/2003 | Casses | 439/157 |
| 2003/0207597 A1 | * | 11/2003 | Motokawa | 439/34 |
| 2003/0217860 A1 | * | 11/2003 | Motokawa | 174/72 A |
| 2005/0056447 A1 | * | 3/2005 | Nakamura et al. | 174/58 |
| 2006/0243870 A1 | * | 11/2006 | Ishiguro et al. | 248/200 |
| 2006/0292902 A1 | * | 12/2006 | Yamamoto et al. | 439/76.2 |
| 2007/0042636 A1 | * | 2/2007 | Yamamoto | 439/475 |

FOREIGN PATENT DOCUMENTS

| | | |
|---|---|---|
| EP | 1 184 270 A2 | 3/2002 |
| JP | 2003-63324 A | 3/2003 |
| JP | 2003-143738 A | 5/2003 |

* cited by examiner

*Primary Examiner*—Ross N Gushi
(74) *Attorney, Agent, or Firm*—Sughrue Mion, PLLC

(57) ABSTRACT

An electrical equipment disassembly structure includes: a housing which houses an electric component therein and whose surface is provided with a recess in which a female connector is located which holds a plurality of connecting terminals electrically connected to the electric component; and a wiring harness which is fixed to the housing in such a way that a male connector attached to a distal end of the wiring harness is connected to the female connector, the wiring harness being separated from the housing by being pulled in a direction perpendicular to the direction in which the male and female connectors are connected to each other, wherein the recess of the housing is provided with a breakable portion which facilitates a breakage of the female connector in the direction of pulling the wiring harness.

5 Claims, 8 Drawing Sheets

ELECTRICAL EQUIPMENT DISASSEMBLY STRUCTURE

BACKGROUND OF THE INVENTION

1. Field of the Invention

The present invention relates to an electrical equipment disassembly structure, and in particular to an electrical equipment disassembly structure which, at the time of disassembly, facilitates a removal of a wiring harness fixed to a housing of electrical equipment.

2. Related Art

In recent years, a vehicle such as an automobile has been equipped with a variety of electric components to which wiring harnesses are connected. Also, in order to form a circuit which connects the electric components to the wiring harnesses, it has been equipped with a junction box (J/B), a relay block (R/B) a joint connector (J/C), a connector holder (C/H), an electronic control unit (ECU) and the like.

However, along with increasing recognition of environmental issues, importance has been placed on recycling of resources, and in a vehicle equipped with a multiplicity of electrical equipment as described above, it has been desired to recover, from a scrapped vehicle, copper used in a conductor of a wiring harness and other metal materials used in electric components.

In response to such circumstances, various electrical equipments have been proposed which can be efficiently removed and recovered from a vehicle body at the time of disassembly of a scrapped vehicle.

In electrical equipment disclosed in JP-A-2003-143738, a surface of a housing is provided with a connector hood for engaging and fixing a connector connected to the distal end of a wiring harness, wherein the thickness of a peripheral wall of the connector hood is set to be 1.5 to 2 times a standard value. At the time of disassembly of a scrapped vehicle, the wiring harness is lifted up by a lifting apparatus such as a crane and removed from a vehicle body together with the housing. The thickness of the peripheral wall of the connector hood is set to be 1.5 to 2 the standard value, whereby the mechanical strength of the connector hood is increased to provide a secure locking of the connector of the wiring harness, thus preventing the wiring harness from being unlocked as the hood breaks at the base at the time of disassembly.

In general, in a case of recycling of a scrapped vehicle, a wiring harness, which mainly uses copper as its conductor, and electric components, which also include other metal materials, are treated separately.

The electrical equipment disclosed in JP-A-2003-143738 is configured in such a way that the mechanical strength of the connector hood is increased to securely lock the connector of the wiring harness, and that the wiring harness is lifted up and recovered together with the housing. Normally, a housing of electrical equipment is securely fixed to a vehicle body, and there is concern that a lifting load of the wiring harness is increased. Furthermore, it is not easy to separate the housing and the wiring harness after the wiring harness has been recovered together with the housing. Cutting off the wiring harness and separating it from the housing can also be considered. In this case, however, there is concern about a reduction in workability, and there is also concern about a reduction in wiring harness recovery rate as part of the wiring harness is left behind in the housing.

The invention has been made in view of the aforementioned circumstances, and an object thereof is to provide an electrical equipment disassembly structure which enables an easy and reliable separation of a wiring harness and a housing at the time of disassembly.

SUMMARY OF THE INVENTION

The object is achieved by an electrical equipment disassembly structure characterized by the following (1) to (5).

(1) An electrical equipment disassembly structure comprising: a housing which houses an electric component therein and whose surface is provided with a recess in which a female connector is located which holds a plurality of connecting terminals electrically connected to the electric component; and a wiring harness which is fixed to the housing in such a way that a male connector attached to a distal end of the wiring harness is connected to the female connector, the wiring harness being separated from the housing by being pulled in a direction perpendicular to the direction in which the male and female connectors are connected to each other, wherein the recess of the housing is provided with a breakable portion which facilitates a breakage of the female connector in the direction of pulling the wiring harness.

(2) An electrical equipment disassembly structure according to (1), wherein the breakable portion is a notch which is provided in a portion of a peripheral wall, which defines the recess, opposite the female connector in the direction of pulling the wiring harness, and which extends from an opening edge of the recess.

(3) An electrical equipment disassembly structure according to (1), wherein the breakable portion is an air gap which is placed, between the peripheral wall which defines the recess and the female connector, in the direction of pulling the wiring harness.

(4) An electrical equipment disassembly structure according to (1), wherein the breakable portion is a portion of the peripheral wall, which defines the recess, opposite the female connector in the direction of pulling the wiring harness, wherein the portion is formed in such a way as to be separable from the peripheral wall.

(5) An electrical equipment disassembly structure according to (1), wherein a plurality of the female connectors are provided in multiple tiers in the direction of pulling the wiring harness, and wherein an air gap, which facilitates a breakage of the female connectors in the direction of pulling the wiring harness, is placed between each pair of adjacent female connectors.

According to the invention, the recess of the housing, in which the female connector is disposed, is provided with the breakable portion which facilitates the breakage of the female connector in the direction of pulling the wiring harnesses, wherein, when the wiring harness is pulled, the female connector breaks easily, whereby the wiring harness is separated from the housing. By this means, it is possible to reduce a wiring harness lifting load which is required, in an electrical equipment disassembly, to separate the wiring harness from the housing. Furthermore; the wiring harness can be reliably separated at its distal end from the housing, thus enabling an increase in the amount of wiring harness recovered. In this way, according to the invention, it is possible, in the electrical equipment disassembly, to easily and reliably separate the wiring harness and the housing.

DETAILED DESCRIPTION OF THE PREFERRED EMBODIMENT

Preferred embodiments of the invention will hereafter be described in detail with reference to the drawings.

First Embodiment

Figure 1:
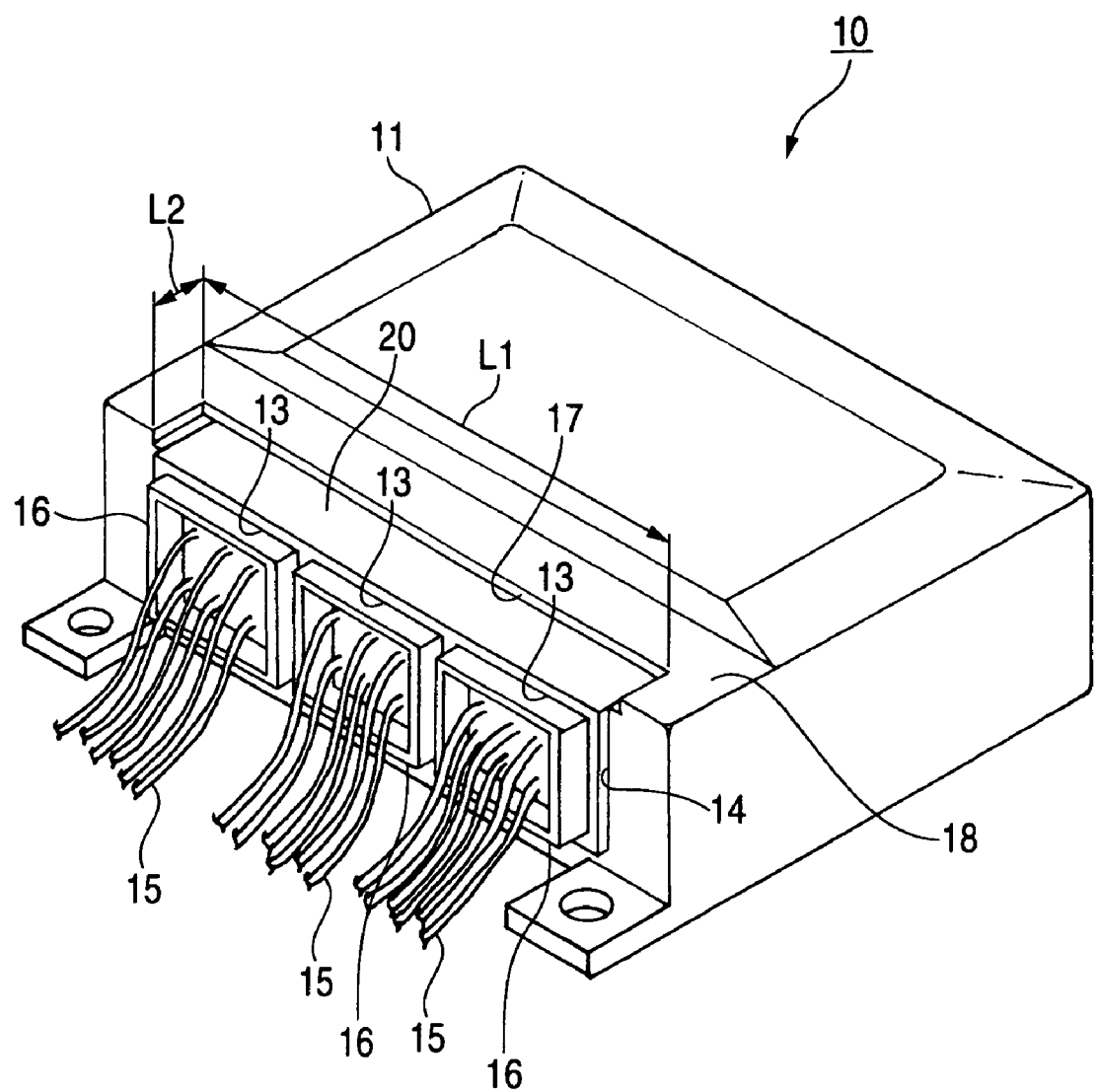
FIG. 1 is an exterior perspective view of electrical equipment, illustrating a first embodiment of an electrical equipment disassembly structure according to the invention.
Figure 2:
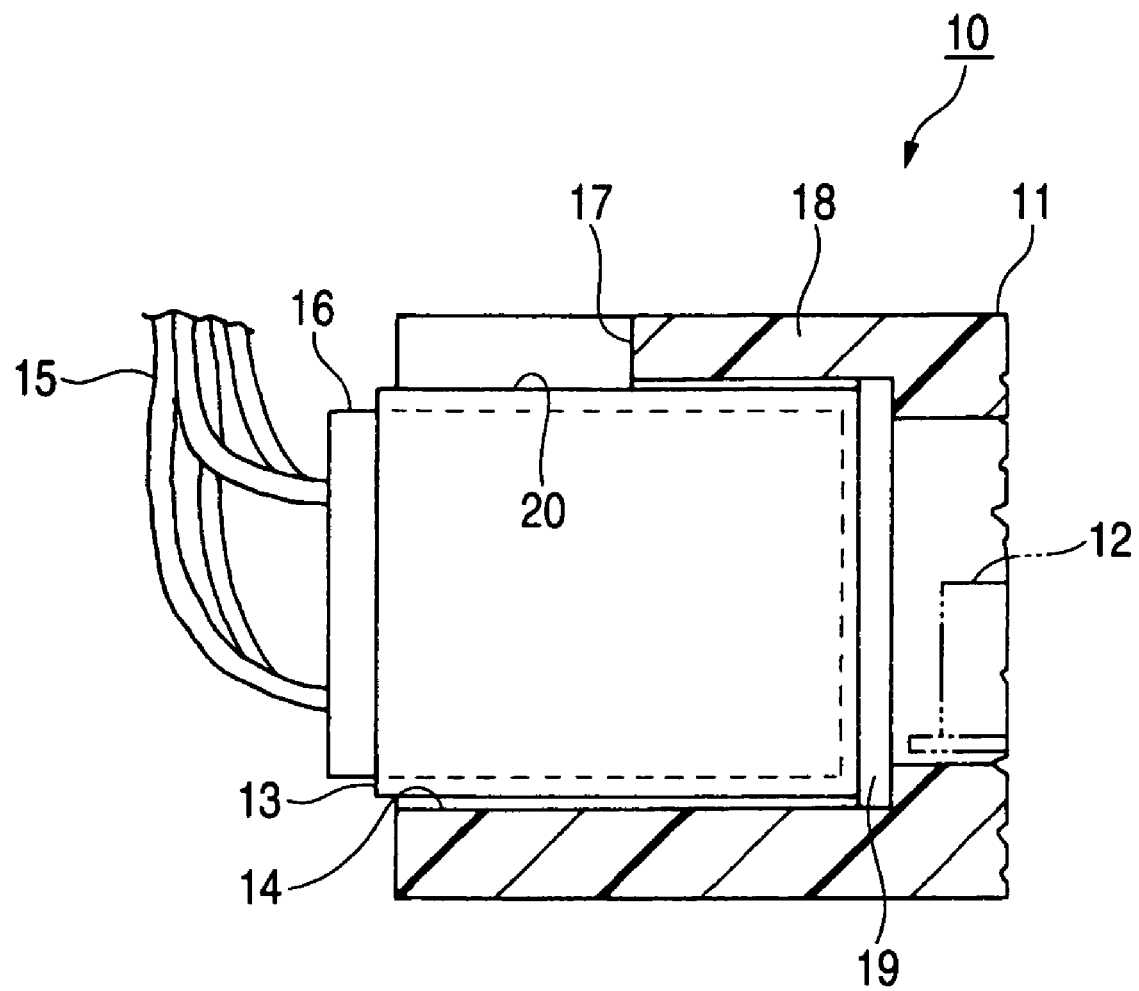
FIG. 2 is a vertical cross-sectional view around male and female connectors of the electrical equipment shown in FIG. 1.

FIG. 1 is an exterior perspective view of electrical equipment, illustrating a first embodiment of an electrical equipment disassembly structure according to the invention, and FIG. 2 is a vertical cross-sectional view around male and female connectors of the electrical equipment shown in FIG. 1.

An electrical equipment disassembly structure 10 of this embodiment is applied to electrical equipment which includes a housing 11 formed in a box shape and wiring harnesses 15 fixed to the housing 11, as shown in FIGS. 1 and 2. The housing 11, being secured to a vehicle body by screwing or the like, houses therein electric components 12 such as a circuit board and various electronic devices.

A horizontally elongated recess 14 extending from side to side is provided in a side of the housing 11. Inside the recess 14, a plurality of (in the example shown in the figure, three) female connectors 13, which each hold a plurality of connecting terminals electrically connected to the electric components 12, is disposed in a line in a longitudinal direction of the recess 14 and fixed to the bottom wall of the recess 14. The three female connectors 13 are integrated with each other. A slight gap is placed between the inner peripheral surface of a peripheral wall 18, which defines the recess 14, and the outer peripheral surface of the integrated three female connectors 13.

A plurality of (in the example shown in the figure, three) male connectors 16, which hold a plurality of connecting terminals electrically connected to the conductors of respective electric wires, is attached to the distal ends of the wiring harnesses 15. The three male connectors 16 are each fitted into one of the female connectors 13 of the housing 11, whereby the wiring harnesses 15 are fixed to the housing 11.

The male and female connectors 13 and 16 are provided with retaining means which maintains their connected condition. An elastically deformable lock arm known heretofore and a retaining projection retained by the lock arm can be given as an example of such retaining means.

In the peripheral wall 18 which defines the recess 14 of the housing 11, a portion thereof opposite the upper surface of the female connectors 13 is provided with a notch 17 extending from an opening edge of the recess 14. The notch 17, having a width L1 equal to or greater than the width of the three female connectors 13 in the longitudinal direction of the recess 14, which are disposed in a line in the longitudinal direction of the recess 14, is formed to have a prescribed length L2 from the opening edge of the recess 14 in such a way as to expose most of the upper surface of the integrated three female connectors 13.

In order to separate the wiring harnesses 15 from the housing 11, the wiring harnesses 15 are lifted upward perpendicular to the direction in which the male and female connectors 13 and 16 are connected to each other, for example, by a lifting apparatus such as a crane. The lifting load acts on the female connectors 13, to which the male connectors 16 are connected, via the male connectors 16 of the wiring harnesses 15.

The female connectors 13, on which the lifting load has acted, flex in such a way that their front end is displaced upward with their base end 19 fixed to the bottom wall of the recess 14, acting as the fulcrum. At this point, most of the upper surface of the female connectors 13 is exposed by the notch 17 provided in the peripheral wall which defines the recess 14. In other words, there is no member that restricts the flexure (upward displacement of the front end) of the female connectors 13. For this reason, when a lifting load which exceeds the strength of the female connectors 13 acts on the female connectors 13, the female connectors 13 break easily.

The breakage of the female connectors 13 and the separation of the wiring harnesses 15 from the housing 11 can take various forms. For example, an upper wall 20 of the female connectors 13 breaks, and the male connectors 16 incline in such a way that their ends on the side of the wiring harnesses 15 are displaced upward, thereby releasing the retention between the male connectors 16 and the female connectors 13, whereby the wiring harnesses 15 are separated from the housing 11 with the female connectors 13 left behind in the housing 11. Or, the fixation of the base end 19 to the bottom wall of the recess 14 breaks, whereby the wiring harnesses 15, together with the female connectors 13, are separated from the housing 11.

As described heretofore, according to the electrical equipment disassembly structure 10 of this embodiment, the recess 14 of the housing 11, in which the female connectors 13 are disposed, is provided with the notch (breakable portion) 17 which facilitates a breakage of the female connectors 13 in the direction of pulling the wiring harnesses 15, wherein, when the wiring harnesses 15 are pulled, the female connectors 13 break easily, whereby the wiring harnesses 15 are separated from the housing 11. By this means, it is possible to reduce a wiring harnesses 15 lifting load which is required, in an electrical equipment disassembly, to separate the wiring harnesses 15 from the housing 11. Furthermore, the wiring harnesses 15 can be reliably separated at their distal ends from the housing 11, thus enabling an increase in the amount of wiring harnesses 15 recovered. In this way, according to the invention, it is possible, in the electrical equipment disassembly, to easily and reliably separate the wiring harnesses 15 and the housing 11.

Second Embodiment

Next, a description will be given, with reference to FIGS. 3 and 4, of a second embodiment of the electrical equipment disassembly structure according to the invention.

Figure 3:
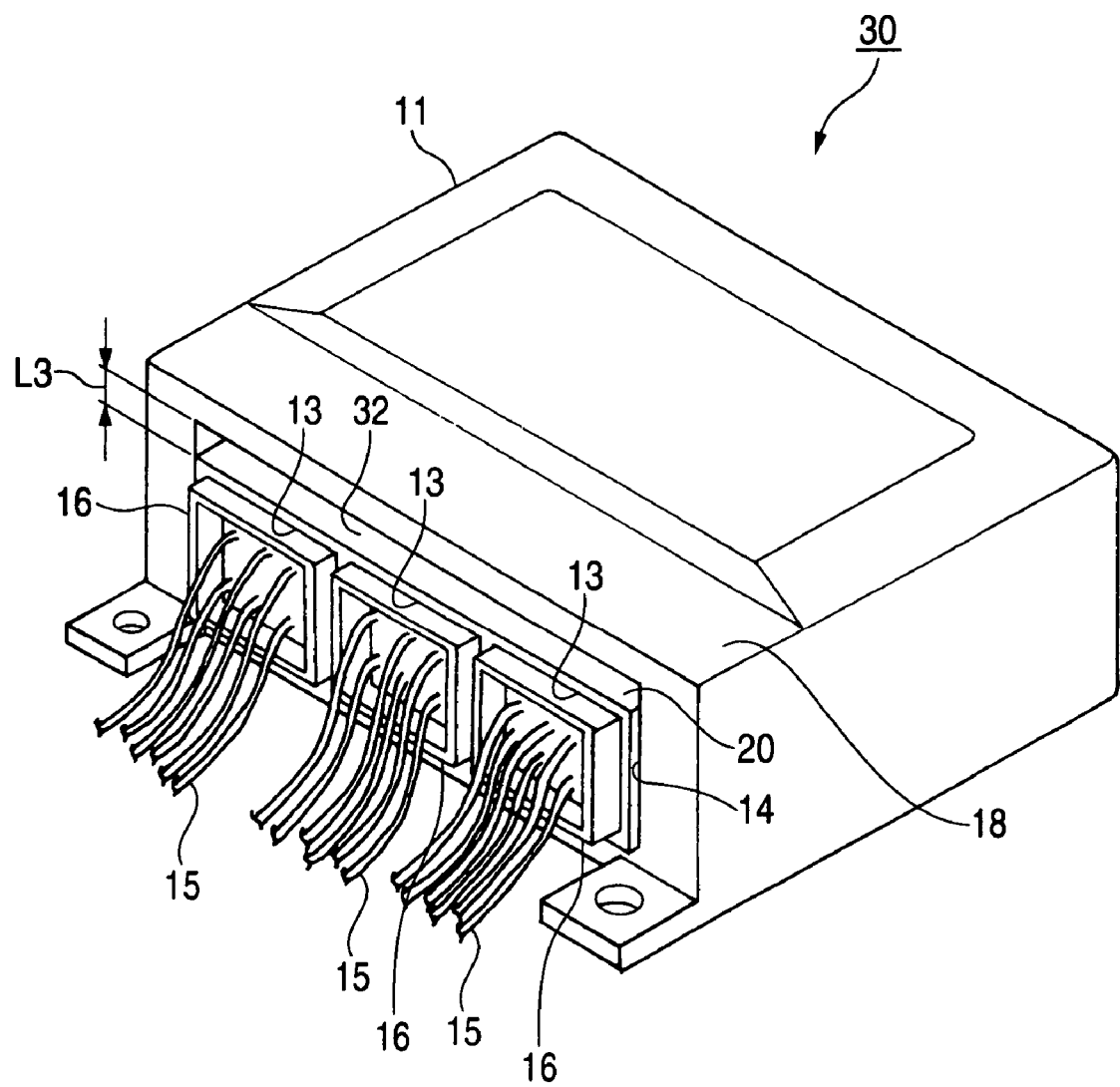
FIG. 3 is an exterior perspective view of electrical equipment, illustrating a second embodiment of the electrical equipment disassembly structure according to the invention.
Figure 4:
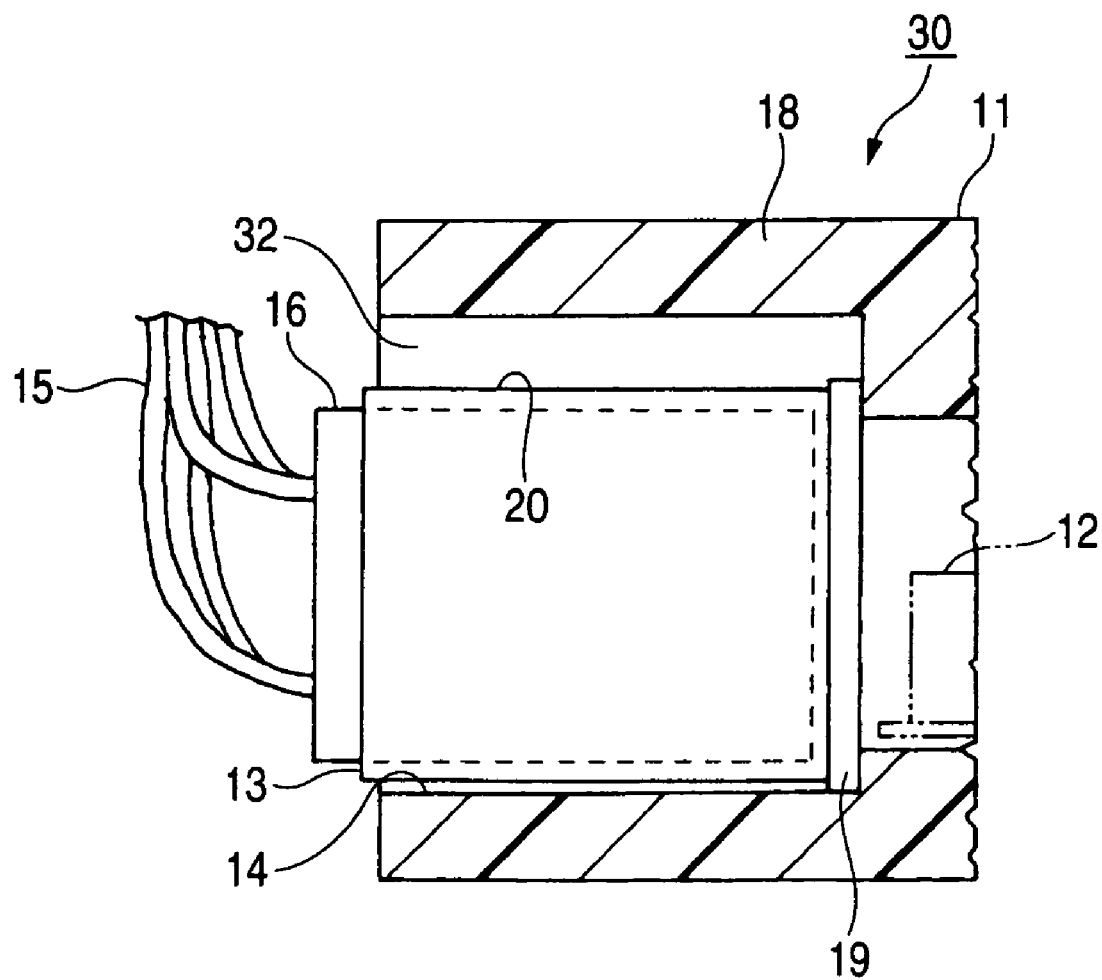
FIG. 4 is a vertical cross-sectional view around male and female connectors of the electrical equipment shown in FIG. 3.

FIG. 3 is an exterior perspective view of electrical equipment, illustrating the second embodiment of the electrical equipment disassembly structure according to the invention, and FIG. 4 is a vertical cross-sectional view around male and female connectors of the electrical equipment shown in FIG. 3. Parts identical or equivalent to those in the first embodiment are given identical reference numerals, and the description will be omitted or simplified.

As shown in FIGS. 3 and 4, in an electrical equipment disassembly structure 30 of the second embodiment, an air gap 32 is provided between the upper wall 20 of the integrated three female connectors 13 and a portion of the peripheral wall 18, which defines the recess 14, opposite the upper wall 20.

The air gap 32 is set to be sufficiently larger than the slight gap placed between an outer peripheral surface, other than the upper surface, of the integrated three female connectors 13 and the inner peripheral surface of the peripheral wall 18 defining the recess 14, and has a prescribed height L3 in order that the female connectors 13 are inclinable within the recess 14.

In order to separate the wiring harnesses 15 from the housing 11, the wiring harnesses 15 are lifted upward, for example, by a lifting apparatus such as a crane. The lifting load acts on the female connectors 13, to which the male connectors 16 are connected, via the male connectors 16 of the wiring harnesses 15.

The female connectors 13, on which the lifting load has acted, flex in such a way that their front end is displaced upward with their base end 19, fixed to the bottom wall of the recess 14 acting as the fulcrum. At this point, because of the provision of the air gap 32, there is no member that restricts the flexure (upward displacement of the front end) of the female connectors 13. For this reason, when a lifting load which exceeds the strength of the female connectors 13 acts on the female connectors 13, the female connectors 13 break easily. The breakage of the female connectors 13 and the separation of the wiring harnesses 15 from the housings 11 can take the same form as in the electrical equipment disassembly structure 10 of the first embodiment.

As described heretofore, according to the electrical equipment disassembly structure 30 of this embodiment, the recess 14 of the housing 11, in which the female connectors 13 are disposed, is provided with the air gap (breakable portion) 32 which facilitates a breakage of the female connectors 13 in the direction of pulling the wiring harnesses 15, wherein, when the wiring harnesses 15 are pulled, the female connectors 13 break easily, whereby the wiring harnesses 15 are separated from the housing 11. By this means, it is possible to reduce a wiring harnesses 15 lifting load which is required, in an electrical equipment disassembly, to separate the wiring harnesses 15 from the housing 11. Furthermore, the wiring harnesses 15 can be reliably separated at their distal ends from the housing 11, thus enabling an increase in the amount of wiring harnesses 15 recovered. In this way, according to the invention, it is possible, in the electrical equipment disassembly, to easily and reliably separate the wiring harnesses 15 and the housing 11.

Third Embodiment

Next, a description will be given, with reference to FIGS. 5 and 6, of a third embodiment of the electrical equipment disassembly structure according to the invention.

Figure 5:
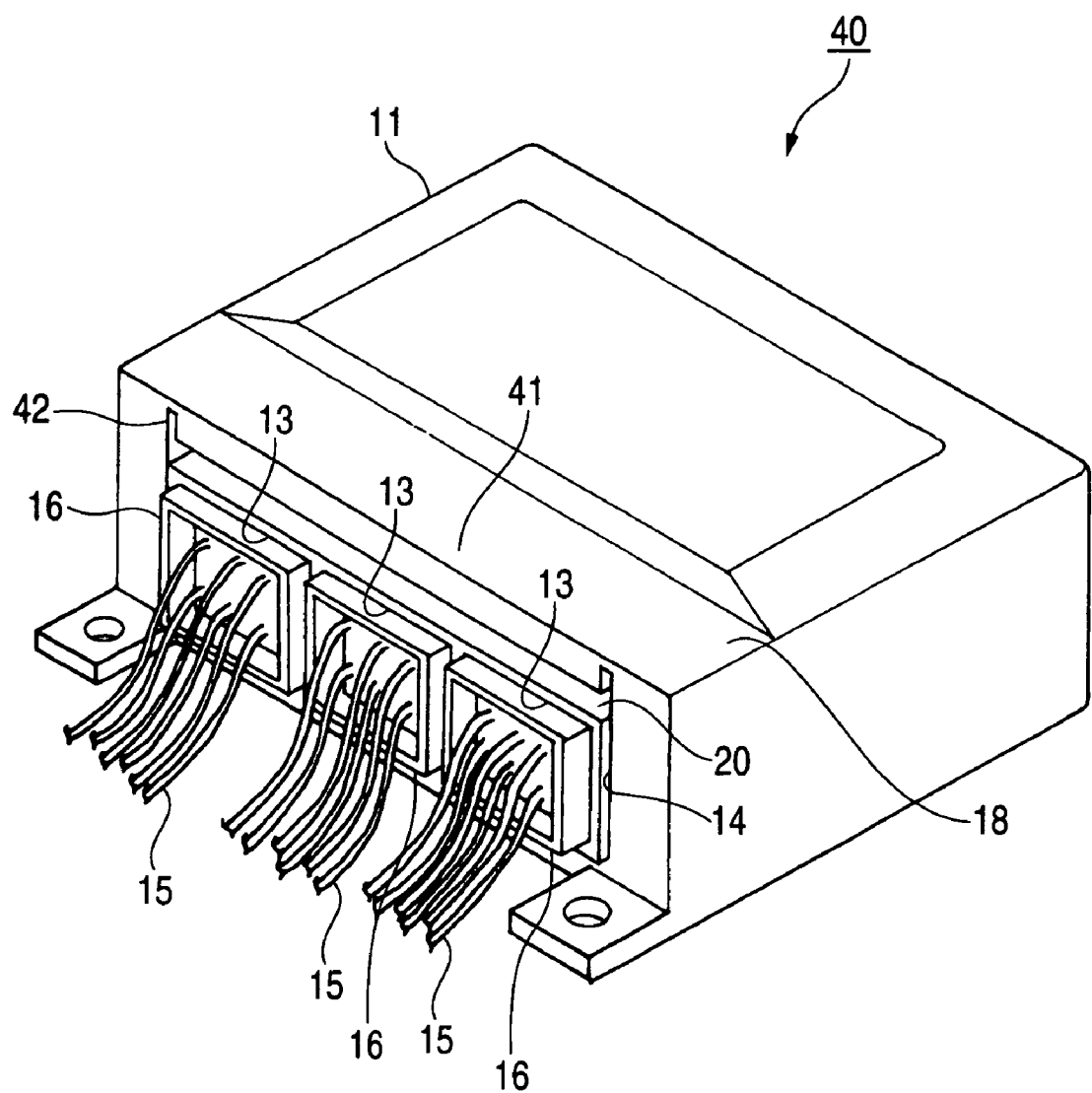
FIG. 5 is an exterior perspective view of electrical equipment, illustrating a third embodiment of the electrical equipment disassembly structure according to the invention.
Figure 6:
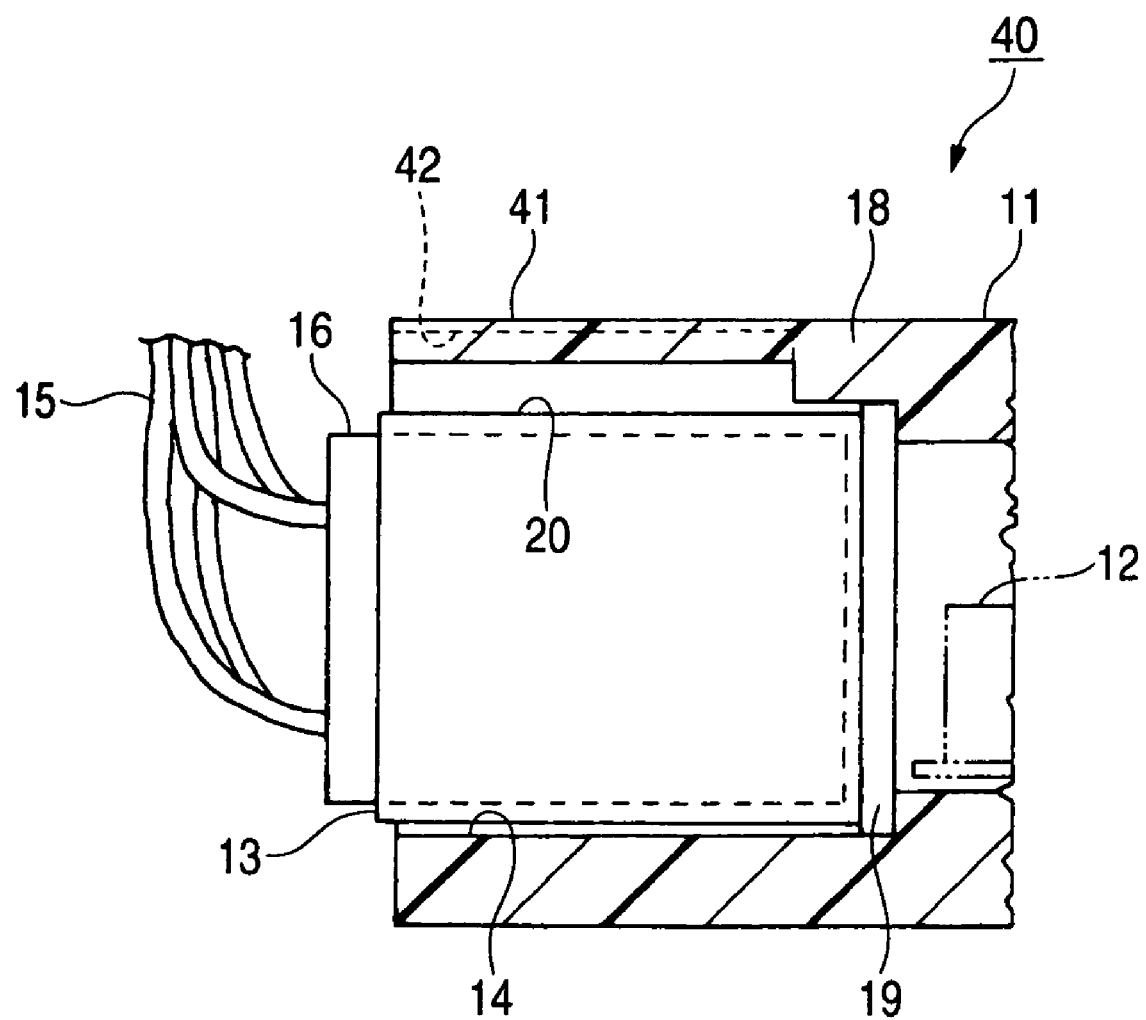
FIG. 6 is a vertical cross-sectional view around male and female connectors of the electrical equipment shown in FIG. 5.

FIG. 5 is an exterior perspective view of electrical equipment, illustrating the third embodiment of the electrical equipment disassembly structure according to the invention, and FIG. 6 is a vertical cross-sectional view around male and female connectors of the electrical equipment shown in FIG. 5. Parts identical or equivalent to those in the first and second embodiments are given identical reference numerals, and the description will be omitted or simplified.

As shown in FIGS. 5 and 6, in an electrical equipment disassembly structure 40 of the third embodiment, in the peripheral wall 18 which defines the recess 14, a portion (hereafter referred to as a separating plate portion) 41 thereof opposite the upper wall 20 of the integrated three connectors 13 is formed in such a way as to be separable from the peripheral wall 18.

The separating plate portion 41 is provided on the peripheral wall 18, being defined by an approximately U-shaped groove which is provided in the inner peripheral surface of the peripheral wall 18 and both ends of which reach the opening edge of the recess 14. The separating plate portion 41 is configured in such a way as to separate from the peripheral wall 18 as a connection 42, which is formed to be thin due to the groove, breaks by a force acting vertically on the separating plate portion 41 (particularly, an edge thereof which forms the opening edge of the recess 14).

In order to separate the wiring harnesses 15 from the housing 11, the wiring harnesses 15 are lifted upward, for example, by a lifting apparatus such as a crane. The lifting load acts on the female connectors 13, to which the male connectors 16 are connected, via the male connectors 16 of the wiring harnesses 15.

The female connectors 13, on which the lifting load has acted, flex in such a way that their front end is displaced upward with their base end 19 fixed to the bottom wall of the recess 14, acting as the fulcrum. The front end of the female connectors 13 presses the edge of the separating plate portion 41 along with the flexure (upward displacement of the front end) of the female connectors 13, whereby the separating plate portion 41 which restricts the flexure of the female connectors 13 is separated and removed from the peripheral wall 18. As a result, when a lifting load which exceeds the strength of the female connectors 13 acts on the female connectors 13, the female connectors 13 break easily. The breakage of the female connectors 13 and the separation of the wiring harnesses 15 from the housing 11 can take the same form as in the electrical equipment disassembly structure 10 of the first embodiment.

As described heretofore, according to the electrical equipment disassembly structure 40 of this embodiment, the recess 14 of the housing 11, in which the female connectors 13 are disposed, is provided with the separating plate portion (breakable portion) 41 which facilitates a breakage of the female connectors 13 in the direction of pulling the wiring harnesses 15, wherein, when the wiring harnesses 15 are pulled, the female connectors 13 break easily, whereby the wiring harnesses 15 are separated from the housing 11. By this means, it is possible to reduce a wiring harnesses 15 lifting load which is required, in an electrical equipment disassembly, to separate the wiring harnesses 15 from the housing 11. Furthermore, the wiring harnesses 15 can be reliably separated at their distal ends from the housing 11, thus enabling an increase in the amount of wiring harnesses 15 recovered. In this way, according to the invention, it is possible, in the electrical equipment disassembly, to easily and reliably separate the wiring harnesses 15 and the housing 11.

In particular, the electrical equipment disassembly structure 40 of this embodiment is suitable for a case in which the female connectors 13 are not desired to be exposed, and a case in which no air gap can be provided between the peripheral wall 18 and the female connectors 13.

Fourth Embodiment

Next, a description will be given, with reference to FIGS. 7 and 8, of a fourth embodiment of the electrical equipment disassembly structure according to the invention.

Figure 7:
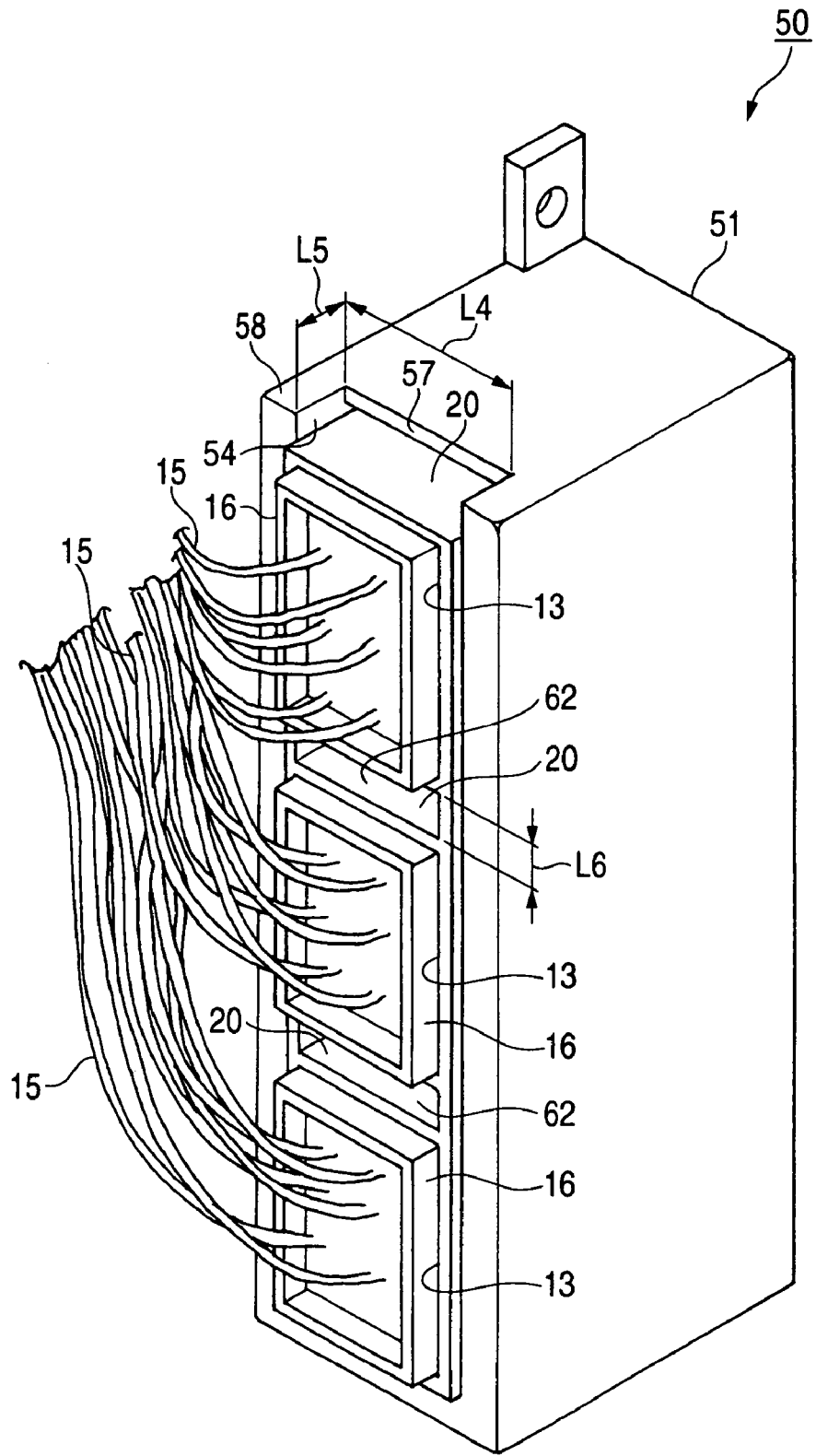
FIG. 7 is an exterior perspective view of electrical equipment, illustrating a fourth embodiment of the electrical equipment disassembly structure according to the invention.
Figure 8:
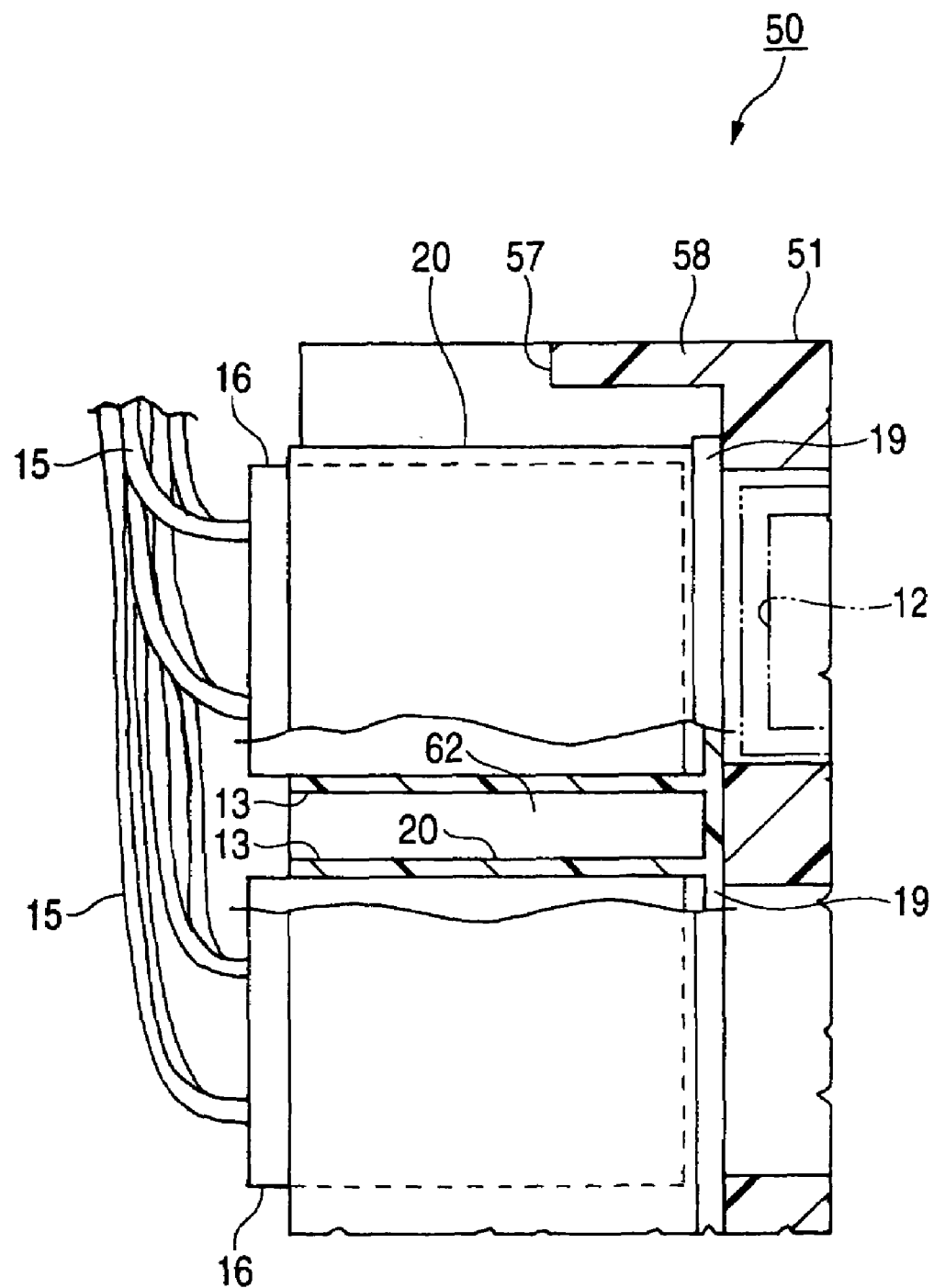
FIG. 8 is a vertical cross-sectional view around male and female connectors of the electrical equipment shown in FIG. 7.

FIG. 7 is an exterior perspective view of electrical equipment, illustrating the fourth embodiment of the electrical equipment disassembly structure according to the invention, and FIG. 8 is a vertical cross-sectional view around male and female connectors of the electrical equipment shown in FIG. 7. Parts identical or equivalent to those in the first, second and third embodiments are given identical reference numerals, and the description will be omitted or simplified.

As shown in FIGS. 7 and 8, an electrical equipment disassembly structure 50 of the fourth embodiment is applied to electrical equipment which includes a housing 51 formed in a box shape and wiring harnesses 15 fixed to the housing 51.

A vertically elongated recess 54 extending up and down is provided in a side of the housing 51. Inside the recess 54, a plurality of (in the example shown in the figure, three) female connectors 13, which each hold a plurality of connecting terminals electrically connected to electric components 12, is disposed in a line in a longitudinal direction of the recess 54 and fixed to the bottom wall of the recess 54.

In a peripheral wall 58 which defines the recess 54 of the housing 51, a portion thereof opposite the upper surface of the uppermost female connector 13 is provided with a notch 57 extending from an opening edge of the recess 54. The notch 57, having a dimension L4 equal to or greater than the width of the female connector 13, is formed to have a prescribed length L5 from the opening edge of the recess 54 so as to expose most of the upper surface of the female connector 13.

Also, although the three female connectors 13 are integrated with each other, an air gap 62 having a prescribed height L6 is provided between each pair of adjacent female connectors 13 in such a way that a lower positioned female connector 13 out of the each pair of adjacent female connectors 13 can be inclined upward.

In order to separate the wiring harnesses 15 from the housing 51, the wiring harnesses 15 are lifted upward perpendicular to the direction in which the male and female connectors 13 and 16 are connected to each other, for example, by a lifting apparatus such as a crane. The lifting load acts on the female connectors 13, to which the male connectors 16 are connected, via the male connectors 16 of the wiring harnesses 15.

The female connectors 13, on which the lifting load has acted, flex in such a way that their front ends are displaced upward with their base ends 19, fixed to the bottom wall of the recess 54, acting as the fulcrums. At this point, most of the upper surface of the uppermost female connector 13 is exposed by the notch 57 provided in the peripheral wall which defines the recess 54. In other words, there is no member that restricts the flexure (upward displacement of the front ends) of the female connectors 13. Also, the air gap 62 is provided between each pair of adjacent female connectors 13, and there is no member which restricts the flexure of a lower positioned female connector 13 out of the each pair of adjacent female connectors 13. For this reason, when a lifting load which exceeds the strength of the female connectors 13 acts on the female connectors 13, the female connectors 13 break easily.

The breakage of the female connectors 13 and the separation of the wiring harnesses 15 from the housing 51 can take various forms. For example, upper walls 20 of the female connectors 13 break, and the male connectors 16 incline in such a way that their ends on the side of the wiring harnesses 15 are displaced upward, thereby releasing the retention between the male connectors 16 and the female connectors 13, whereby the wiring harnesses 15 are separated from the housing 51 with the female connectors 13 left behind in the housing 51. Or, the fixation of the base ends 19 to the bottom wall of the recess 54 breaks, whereby the wiring harnesses 15, together with the female connectors 13, are separated from the housing 51.

As described heretofore, according to the electrical equipment disassembly structure 50 of this embodiment, in a case in which a plurality of the female connectors 13 are provided in multiple tiers in the direction of pulling the wiring harnesses 15, the recess 54 of the housing 51, in which the female connectors 13 are disposed, is provided with the notch (breakable portion) 57 which facilitates a breakage of the uppermost female connector 13 in the direction of pulling the wiring harnesses 15. At the same time, provided between each pair of adjacent female connectors 13 is the air gap 62 which facilitates a breakage of a lower positioned female connector 13, out of the each pair of adjacent female connectors 13, in the direction of pulling the wiring harnesses 15. Thus, when the wiring harnesses 15 are pulled, the female connectors 13 break easily, whereby the wiring harnesses 15 are separated from the housing 51. By this means, it is possible to reduce a wiring harnesses 15 lifting load which is required, in an electrical equipment disassembly, to separate the wiring harnesses 15 from the housing 51. Furthermore, the wiring harnesses 15 can be reliably separated at their distal ends from the housing 51, thus enabling an increase in the amount of wiring harnesses 15 recovered. In this way, according to the invention, it is possible, in the electrical equipment disassembly, to easily and reliably separate the wiring harnesses 15 and the housing 51.

The invention is not limited to each aforementioned embodiment, but modifications, improvements and the like are possible as appropriate. For example, the notch 17, air gap 32 and separating plate portion 41, which act as the breakable portion, can also be used in combination in suiting with a place to which the electrical equipment is applied.

What is claimed is:

1. An electrical equipment disassembly structure comprising:
    a housing which houses an electric component therein and whose surface is provided with a recess in which a female connector is located which holds a plurality of connecting terminals electrically connected to the electric component; and
    a wiring harness which is fixed to the housing in such a way that a male connector attached to a distal end of the wiring harness is connected to the female connector, the wiring harness being separated from the housing by being pulled in a direction perpendicular to the direction in which the male and female connectors are connected to each other, wherein
    the recess of the housing is provided with a breakable portion which facilitates a breakage of the female connector in the direction of pulling the wiring harness.

2. An electrical equipment disassembly structure according to claim 1, wherein the breakable portion is a notch which is provided in a portion of a peripheral wall, which defines the recess, opposite the female connector in the direction of pulling the wiring harness, and which extends from an opening edge of the recess.

3. An electrical equipment disassembly structure according to claim 1, wherein the breakable portion is an air gap which is placed, between the peripheral wall which defines the recess and the female connector, in the direction of pulling the wiring harness.

4. An electrical equipment disassembly structure according to claim 1, wherein the breakable portion is a portion of the peripheral wall, which defines the recess, opposite the female connector in the direction of pulling the wiring harness, wherein the portion is formed in such a way as to be separable from the peripheral wall.

5. An electrical equipment disassembly structure according to claim 1, wherein a plurality of the female connectors are located in multiple tiers in the direction of pulling the wiring harness, and wherein an air gap, which facilitates a breakage of the female connectors in the direction of pulling the wiring harness, is placed between each pair of adjacent female connectors.

* * * * *